(12) United States Patent
Wong (10) Patent No.: US 9,937,479 B2
(45) Date of Patent: Apr. 10, 2018

(54) CONVERSION OF NATURAL GAS TO LIQUID FORM USING A ROTATION/SEPARATION SYSTEM IN A CHEMICAL REACTOR

(71) Applicant: Alfred Y. Wong, Los Angeles, CA (US)

(72) Inventor: Alfred Y. Wong, Los Angeles, CA (US)

(*) Notice: Subject to any disclaimer, the term of this patent is extended or adjusted under 35 U.S.C. 154(b) by 0 days.

(21) Appl. No.: 14/592,676

(22) Filed: Jan. 8, 2015

(65) Prior Publication Data

US 2015/0158008 A1 Jun. 11, 2015

Related U.S. Application Data

(63) Continuation-in-part of application No. 12/850,633, filed on Aug. 5, 2010, now abandoned, which is a
(Continued)

(51) Int. Cl.
*B01J 19/08* (2006.01)
*C10G 50/00* (2006.01)
(Continued)

(52) U.S. Cl.
CPC ........... *B01J 19/088* (2013.01); *B01J 19/087* (2013.01); *B01J 19/121* (2013.01); *B01J 19/126* (2013.01);
(Continued)

(58) Field of Classification Search
CPC ............... B01J 19/088; B01J 2219/085; B01J 2219/0805; B01J 19/087; B01J 19/121;
(Continued)

(56) References Cited

U.S. PATENT DOCUMENTS 3,376,211 A * 4/1968 Bjornson ................. 422/186.03
3,663,394 A * 5/1972 Kawahara ............. B01J 19/126
204/168
(Continued)

FOREIGN PATENT DOCUMENTS

WO 2012/142232 A1 10/2012
WO 2014/204531 A2 12/2014

OTHER PUBLICATIONS

Serway, Physics for Scientists & Engineers with Modern Physics, $3^{rd}$ ed., © 1990, sec. 29.5 "Motion of a charged particle in a magnetic field," pp. 815-817.*

Primary Examiner — Ibrahime A Abraham
Assistant Examiner — Collen M Raphael
(74) Attorney, Agent, or Firm — Vorys, Sater, Seymour and Pease LLP; Vincent M DeLuca (57) ABSTRACT

A system and method are provided for the separation of hydrogen from natural gas feedstock to form hydrocarbon radicals. Aspects of the system include perpendicular magnetic and electric fields, a method of radical formation that separates hydrogen from the reaction process, and a separation method based on centrifugal forces and phase transitions. The gases rotate in the chamber due to the Lorentz force without any mechanical motion. Rotation separates gases and liquids by centrifugal force. The lighter species are collected from the mid region endpoint of the apparatus and fed back for further reaction. A new concept of controlled turbulence is introduced to mix various species. A novel magnetic field device is introduced comprised of two specially magnetized cylinders. A novel control of temperatures, pressures, electron densities and profiles by, RF, microwaves, UV and rotation frequency are possible especially when atomic, molecular, cyclotron resonances are taken into account. The electrodes can be coated with
(Continued)

catalysts; the entire apparatus can be used as a new type of chemical reactor.

13 Claims, 13 Drawing Sheets

Related U.S. Application Data continuation-in-part of application No. 12/783,550, filed on May 19, 2010, now Pat. No. 8,298,318.

(60) Provisional application No. 61/179,625, filed on May 19, 2009.

(51) Int. Cl.
    *C10G 2/00*         (2006.01)
    *H05H 1/46*         (2006.01)
    *B01J 19/12*         (2006.01)

(52) U.S. Cl.
CPC .......... *B01J 19/128* (2013.01); *B01J 19/129* (2013.01); *C10G 2/00* (2013.01); *C10G 50/00* (2013.01); *H05H 1/46* (2013.01); *B01J 2219/083* (2013.01); *B01J 2219/0809* (2013.01); *B01J 2219/0852* (2013.01); *B01J 2219/0854* (2013.01); *B01J 2219/0869* (2013.01); *B01J 2219/0871* (2013.01); *B01J 2219/0883* (2013.01); *C10G 2300/1025* (2013.01); *C10G 2400/02* (2013.01); *C10G 2400/04* (2013.01); *C10G 2400/06* (2013.01); *C10G 2400/08* (2013.01); *H05H 2001/4607* (2013.01); *H05H 2001/4645* (2013.01)

(58) Field of Classification Search
CPC ...... B01J 19/126; B01J 19/128; B01J 19/129; B01J 2219/0809; B01J 2219/083; B01J 2219/0852; B01J 2219/0883; B01J 2219/0854; B01J 2219/0871; B01J 2219/0869; C10L 1/04; C10L 2290/38; C10L 2290/40; H05H 2001/4615; H05H 2001/4622; H05H 2001/463; H05H 2001/4637; H05H 1/46; H05H 2001/4607; H05H 2007/027; H05H 1/0062; H05H 1/18; H05H 1/30; H05H 2001/4645; C10G 50/00; C10G 2/00; C10G 2400/08; C10G 2400/06; C10G 2400/04; C10G 2300/1025; C10G 2400/02

USPC ............... 204/156; 422/186.03, 186–187; 219/678–763

See application file for complete search history.

(56) References Cited

U.S. PATENT DOCUMENTS

| | | | | |
|---|---|---|---|---|
| 3,703,460 | A | * | 11/1972 | Shair et al. ............... 422/186.04 |
| 3,791,949 | A | * | 2/1974 | Hirayama et al. ............ 204/171 |
| 4,574,038 | A | * | 3/1986 | Wan ....................... B01J 19/126 |
| | | | | 204/157.15 |
| 4,975,164 | A | * | 12/1990 | Ravella .................. B01J 19/088 |
| | | | | 204/156 |
| 5,186,799 | A | * | 2/1993 | Murphy .................. B01J 12/002 |
| | | | | 204/156 |
| 5,270,515 | A | * | 12/1993 | Long ...................... B01J 19/126 |
| | | | | 219/121.36 |
| 5,277,773 | A | * | 1/1994 | Murphy .................... C01B 3/24 |
| | | | | 204/156 |
| 5,666,023 | A | * | 9/1997 | Pelletier ..................... 313/359.1 |
| 6,824,748 | B2 | * | 11/2004 | Kaushal ............. B01D 53/8662 |
| | | | | 422/198 |
| 2007/0235419 | A1 | * | 10/2007 | Kong ....................... H05H 1/30 |
| | | | | 219/121.36 |
| 2008/0283411 | A1 | * | 11/2008 | Eastman .................. C10G 2/30 |
| | | | | 204/277 |
| 2009/0205254 | A1 | * | 8/2009 | Zhu et al. .................... 48/127.7 |
| 2010/0294666 | A1 | | 11/2010 | Wong |
| 2011/0011728 | A1 | * | 1/2011 | Sackinger ............. B01J 19/082 |
| | | | | 204/155 |
| 2011/0188623 | A1 | | 8/2011 | Wong |
| 2014/0219407 | A1 | | 8/2014 | Wong |

\* cited by examiner

CONVERSION OF NATURAL GAS TO LIQUID FORM USING A ROTATION/SEPARATION SYSTEM IN A CHEMICAL REACTOR

CROSS-REFERENCE TO RELATED APPLICATIONS

This application claims priority under 35 U.S.C. 119(e) from provisional application Ser. No. 61/910,551 filed Jan. 8, 2014. This application further claims priority under 35 U.S.C. 120 as a continuation-in-part of co-pending application Ser. No. 12/850,633 filed Aug. 5, 2010, which is a continuation-in-part of application Ser. No. 12/783,550 filed May 19, 2010, (now U.S. Pat. No. 8,298,318) which claims priority under 35 U.S.C. 119(e) from provisional application Ser. No. 61/179,625 filed May 19, 2009, the disclosures of which are incorporated herein by reference in their entireties.

FIELD

This disclosure generally relates to a method and apparatus to produce liquid hydrocarbons from gaseous fuel feedstock in a continuous flow-through reaction system.

BACKGROUND

The supply of energy from natural gas is restricted by the inability to economically transport gaseous energy forms from the production point to the point of distribution or use. It is vastly more desirable to have liquid versus gaseous hydrocarbons to make the recovery and transport of the energy economically feasible. As such, natural gas produced as a byproduct of crude oil extraction from onshore or offshore oil wells is often simply burned off or "flared" as waste or unusable gas instead of being harvested. A simple, cost efficient method of converting natural gas to a more energy-dense liquid form without expensive refrigeration is therefore required. Current methods for liquefying natural gas include the Fischer-Tropsch and related processes, as well as refrigeration and condensation to form liquefied natural gas (LNG). However, each of these methods is economically limited. This disclosure describes a superior method of liquefying natural gas for transport and distribution to increase the worldwide supply of this natural and inexpensive energy source. This method is based on basic principles in physics and chemistry, confirmed by theory and experiments.

SUMMARY

Embodiments of the present disclosure relate to a system and methods to produce liquid and solid hydrocarbons from gaseous hydrocarbon feedstock in a continuous, flow-through reaction system without the use of a catalyst. Elements of this system include improvements by electromagnetic plasma technologies, rotation critical in separating hydrogen from hydrocarbon radicals, a conversion of gaseous hydrocarbon feedstock to liquid hydrocarbons through the enriching of the feedstock in free radicals, and a separation of liquid hydrocarbon products and hydrogen gas from reacted gaseous hydrocarbon feedstock in a rotating system. One aspect of the high frequency of rotation is that chemical bonds may be broken by high centrifugal force (effective gravitational or g field). One embodiment of the apparatus produces an electric field and hence a current is generated in a radial direction within a magnetic field generated in an axial direction. The radial electric field and axial magnetic field together produces an E×B force, which acts upon charged particles with a force in the azimuth direction with respect to the axis of the chamber. A key feature of this design is its scalability, as permitted by the novel electromagnetic design without any moving mechanical parts. Provision is made to further separate the liquids by arrays of collectors with appropriate pressures and temperatures to take each liquid state out in its unique molecular form.

Scalability of the apparatus and process is an important advantage of this invention. One aspect contributing to this scalability is the use of a novel magnetic field source as described within. Furthermore, consistent with the immediate goal of optimizing the conversion of natural gas to LNG or liquid form, the apparatus described below is designed to possess simple and reliable controls of temperatures and pressures at the location where conversion takes place, namely at the outer shroud. Therefore this invention describes a general device for the conversion of molecules to the four forms of matter: solid, liquid, gas and plasma. A further feature of this apparatus is expected to enhance the rate or efficiency of any process occurring within the apparatus. This is the introduction of "controlled turbulence" through the imposition of changes in the driving electric fields, thereby changing the temporal behavior of the electromagnetic forces and the consequent changes in the rate of rotation. This controlled turbulence will change the degree of mixing among molecules at different radii. The foregoing and other objects, features and advantages of the present disclosure will become more readily apparent from the following detailed description of exemplary embodiments as disclosed herein.

In addition to the rotation apparatus described, it is also possible to implement the apparatus with a separate or integrated RF source, for example a plasma torch. RF is used to produce RF bond resonance or an RF plasma; heating electrons instead of the whole mass. This can be tuned and controlled to facilitate the chemical reactions that are advantageous to the production of the desired end product. The RF source can be separately constructed and attached to the rotation apparatus to provide an influx of desired radical chemical species or it may be integrated with or within the rotation device. Optionally, a nanotip electron emitter can be emplaced (in approximately the same locations as an RF source would logically be placed) to facilitate the formation of radicals and drive the desired chemical reactions. The addition of water to produce methanol during the aforesaid processes is also suggested. The addition of integrated optical and mass spectrometric diagnostics, for instance a residual gas analyzer, is an option to assist in identify of chemical and physical species and to assist in the control of the reactions. The electron density and temperature can be controlled digitally through manipulation of any or all of the devices or options mentioned. UV wavelength produced with RF can be controlled to produce radicals and avoid complete breakdown of molecules. A key differentiation of this apparatus and its suggested options is that ions in the process stream drive ~$10^6$ times their mass of neutrals at rotation frequencies up to 100,000 RPS.

The element of temperature within the reaction chamber may be controlled by RF frequency or by cooling or heating the reaction chamber. The element of pressure can be controlled by the frequency of rotation by varying the electric field, the magnetic field, or both. The apparatus can be configured with various geometries of the outer electrode or vacuum sheath and provided with catalytic surfaces. In combination with the control of other variables described, a novel chemical reactor for solid, liquid and gas products is disclosed.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

Natural gas molecules, e.g. methane or $CH_4$, which are caused to form into "radical" species such as $CH_3$, $CH_2$, $CH_1$, et cetera (referred to generically as $CH_X$), will readily react to form longer chain hydrocarbons with other radical hydrocarbons. Pentane ($C_5H_{12}$) is the first liquid hydrocarbon at room temperature to be formed by this chain lengthening. Feedstock natural gas in combination with an electron donor species such as argon can be made to rotate if an electric current is passed through them in the presence of a magnetic field. Due to the Lorentz force, proper rotation is achieved without any mechanical motion. Rotation of the gas in the chamber causes the separation of heavy chemical species from light species by centrifugal forces. Reacted natural gas undergoes carbon chain lengthening. This process leads to formation of pentane species, which are non-volatile and are separated from lighter species by centrifugal force and also by precipitation. Lighter and volatile gas species are recirculated for re-ionization and reaction until the end product, pentane (liquid at room temperature), is removed. In the process of lengthening the hydrocarbon feedstock gas, its links to hydrogen atoms must first be broken so that other carbon atoms can be attached to them. The released hydrogen gas is quickly extracted from the apparatus to avoid reformation of the initial species. This released hydrogen gas is a desirable feedstock for clean energy production.

The figures below describe an exemplary apparatus. However, the apparatus may be modified or constructed differently to afford better scalability or suitability to a given chemical reaction or physical separation. For instance, the anode and cathode can be reversed; the anode and cathode may also comprise the magnetic field device; the outer electrode may comprise the outer shroud of the apparatus or may be contained within an additional outer shroud.

Figure 1:
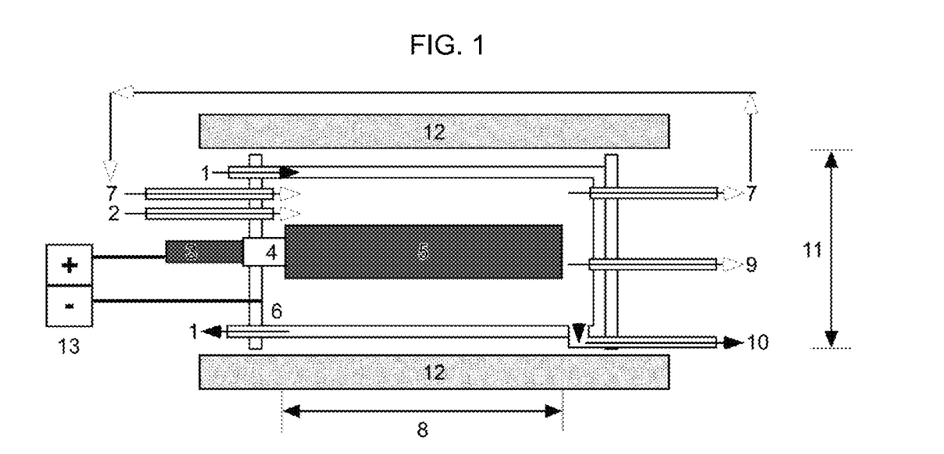
FIG. 1 illustrates an exemplary horizontal system for the reaction and recovery of fuel stocks in accordance with one aspect of the invention.

The components of the system shown in FIG. 1 are listed below:
1. Cooling water input (solid arrow denotes liquid flow)
2. Methane/argon gas input/feed
3. Central discharge rod (anode in)
4. Central discharge rod insulation
5. Cylindrical inner cylindrical anode electrode
6. External discharge shell (outer cylindrical cathode electrode, double-walled capped cylinder filled with cooling fluid, 1)
7. Unreacted gas (methane, argon) feedback line
8. Region of forced rotation and plasma formation within chamber
9. Hydrogen gas output to reservoir
10. Heavy gas and liquid product (pentane) output to reservoir
11. Region of vacuum within chamber
12. Magnetic field array
13. Power supply (5-500 VDC)

Referring to FIG. 1, the system is operated within a dual cylindrical magnet or magnetic field array (12). An outer shroud or cylindrical shell (6), made from a material such as stainless steel, is placed within the central cavity of the magnet 12. This shroud is closed with respective ports pumping out solution and feeding in solution. Within this shroud, an inner electrode (5) is placed which is electrically biased with respect to the shroud wall. The apparatus is then placed within the magnetic field of the magnetic field array 12. The outer cylindrical shell (6) is provided with double walls to provide for flow therethrough of a cooling solution (1) from an inlet port to an outlet port. This inlet/outlet cooling flow through the outer shell (6) provides temperature control with typical fluids from approximately 50° C. to as low as −180° C. with for instance liquid nitrogen. The outer shell (6) also acts as an electrode (cathode, ground). The anode consists of a central discharge rod (3), insulation (4) and an exposed cylindrical anode (5). The magnet 12 may be a superconducting or non-superconducting magnet having a magnetic field in the axial direction and perpendicular to the radial DC field between the anode (i.e. electrode 5) and cathode (i.e. shell 6). An electrical current is provided by a power supply (13), preferably but not restricted to 5 to 500V DC. The feedstock natural gas is mixed externally to a desired proportion with an ionizable gas, such as for example argon (or similar easily ionizable gas) and is fed into inlet (2) of the cylindrical shell (6). When the feedstock gas is subjected to the electric field within region (8), a plasma is formed and the dissociation of the feedstock gas into $CH_X$ radicals and hydrogen atoms begins; where the hydrocarbon chain increase in length is enabled by the presence of radicals such as $CH_3$ or $CH_2$, provided the detached hydrogen atoms migrate to the central region of the cylinder shell 6, where they are extracted as hydrogen gas. In the same region (8) rotation of the ionized gases occurs due to the radial electric field and the perpendicular magnetic field. A vacuum may be imposed within the cylindrical shell (6) through the region (11). The gases react as they move left to right through region (8), producing longer carbon chain species and hydrogen gas at different radii in the cylinder. Due to the high rotational velocity, heavier gases and liquid are forced to the outside of the cylindrical shell. This allows liquid pentane to be collected at a larger radius through output (10) and hydrogen to be collected through output (9) at the inner radius. Unreacted hydrocarbon gases and argon are recycled through feedback line (7) at a smaller middle radius. Dissociation of species is promoted and prolonged in time by the rotational forces and electric fields (primarily DC but optionally augmented with AC disruptive pulses) within the shroud or shell 6.

Alternatively, a newly designed permanent magnet consisting of the anode and cathode can be used to replace the external superconducting magnet (12) to facilitate scaling and portability of the instrument. The roles of electrodes as anodes and cathodes can be reversed without loss of generality.

It is also possible to use an interior surface of an outer cylinder, whether it is the outer electrode or the vacuum shroud, to assist in chemical reactions. The interior surface may be coated with a catalyst to enhance specific chemical reactions in concert with manipulation of liquid or gas phases at the surface through control of temperature or pressure by means described herein.

Figure 2:
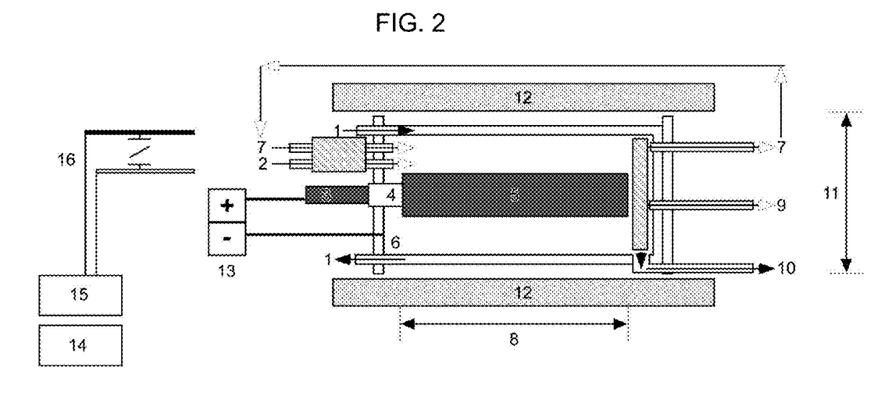
FIG. 2 illustrates an exemplary system showing how an RF excitation source can be integrated with the apparatus to increase the efficiency of producing ions.

FIG. 2 illustrates the addition of an RF source at two example locations on the apparatus. An RF source can be added to the apparatus depicted in FIG. 1 to dissociate gaseous hydrocarbons more efficiently and more quickly produce the desired liquid end product. The RF source produces an oscillating electric field that imparts energy to electrons. For example, a 3 kW RF amplifier (14) is tuned through a variable capacitor (15) and radiated through an antenna apparatus (16). The antenna (16) can for example be placed in the proximity of either one or both of the areas depicted as hatched boxes. The electrons produced by the RF source and radiated by the antenna into the cylindrical shroud break the C—H bonds, thereby dissociating the molecules. The components are listed below.
14. Power supply
15. Frequency tuner
16. Antenna(e)

Figure 11:
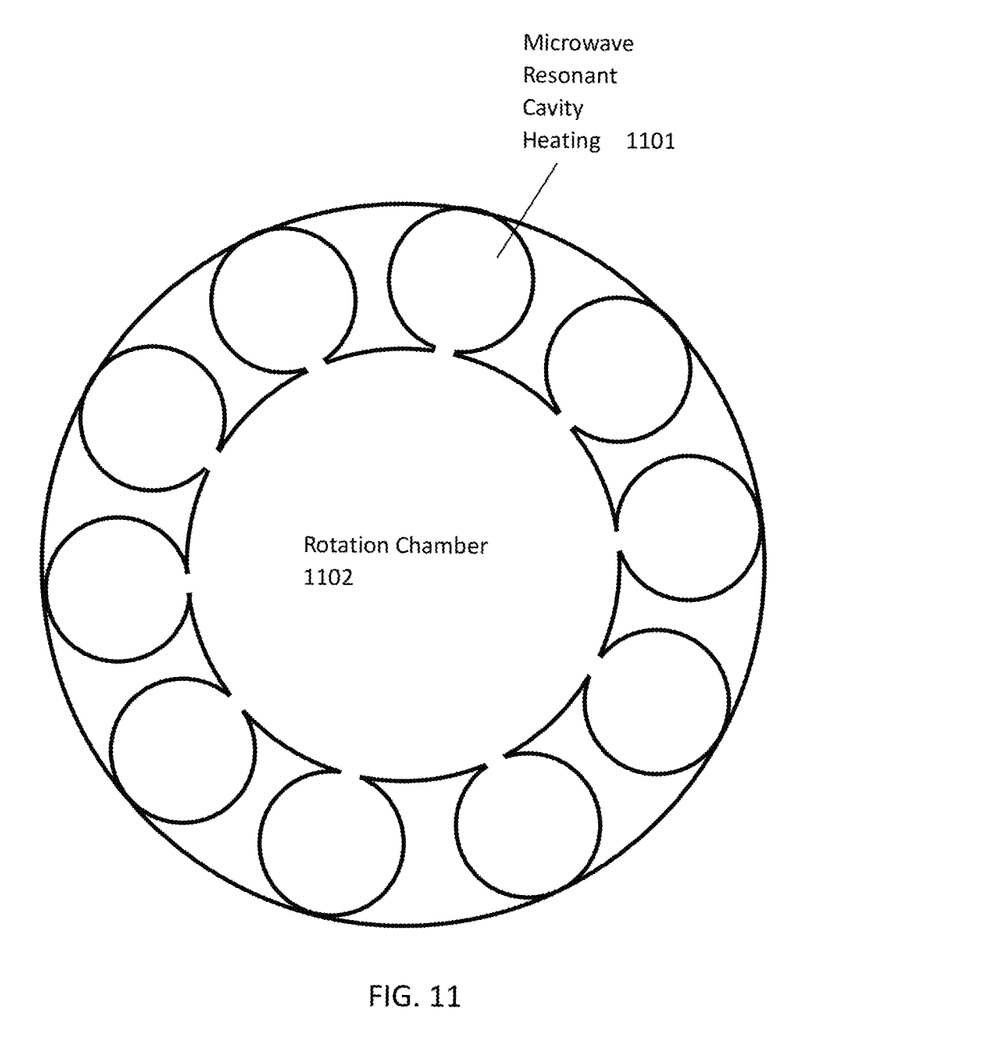
FIG. 11 is a schematic diagram showing the use of microwave cavities to couple electromagnetic energy into the rotation chamber of the system.

The RF source placed for example externally to the apparatus would provide an influx of desired radical species to the rotation species through inlet (2), (7). Alternatively, the RF source could be placed internally (for example in the area of the hatched box at the right-hand side of the shroud 6). The locations given as examples for the RF source might also be used to emplace nanotip emitters to provide an electron source to produce desired radical species. Another configuration using microwave cavities to couple electromagnetic energy directly into the system is shown in FIG. 11 where the cavities 1101 surround the main rotating chamber 1102. This kind of coupling allows an efficient ionization of the input neutral gas mixtures. Such electromagnetic waves can be modulated to produce desirable resonances of chemical bonds. Additionally, other forms of energy may be used such as microwave energy, infrared energy, and laser energy.

Additional inlets or outlets (not shown) could provide for the influx of, for example, water to produce methanol. Additional outlets could allow for more discriminating separation of chemical reaction products.

It is further pointed out that hydrocarbon liquids or methanol can be rotated as well using the Lorentz force associated with a current in the conducting fluid. Liquids have the advantage that it is simple to produce charges in the liquid, which do not recombine. The Lorentz force will rotate the liquid and separation can occur. All discussions herein on gases on separation and chemical reactions can be applied to a liquid; gases and liquids are generally considered as fluids.

Figure 3:
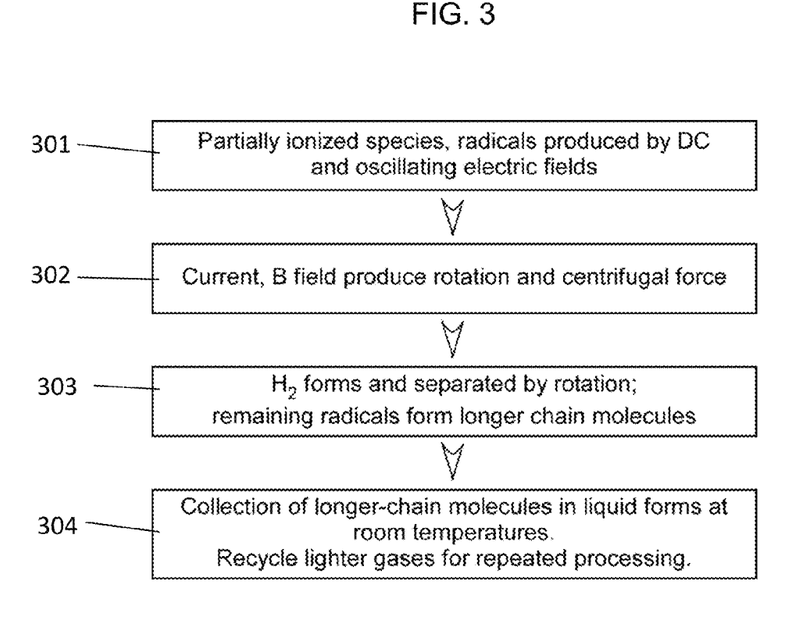
FIG. 3 is a flow chart of an exemplary method for the reaction and recovery of liquid hydrocarbons by the present invention.

FIG. 3 is a flowchart of one example of a desired process in accordance with the present disclosure, illustrating an exemplary method for the production and recovery of liquid hydrocarbons from natural gas feedstocks. The general principle is the reactivity of natural gas radicals with each other. Once gases are decomposed into hydrogen and radicals (301), the radicals are reactive because one covalent bond is open or "dangling" and ready to combine with another radical to form a new stable molecule. At 302, the electric and magnetic fields (Lorentz force) produce rotation of the hydrocarbon plasma and a consequent centrifugal force. At 303, $H_2$ forms and is separated from the hydrocarbon molecules by the rotation of the plasma. The remaining radicals react with each other to form longer chain hydrocarbons. At 304, the longer chain hydrocarbon molecules in liquid form are collected at room temperatures, and lighter (e.g. hydrogen) gases may be recycled through the system for repeated processing.

Figure 4A:
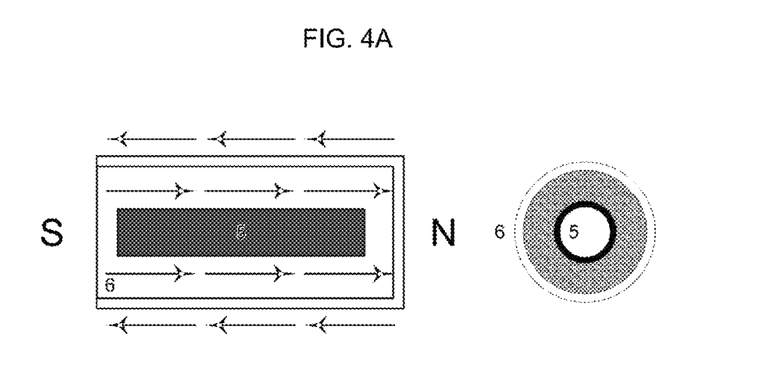
FIGS. 4A-4D are schematics of various embodiments of the axial magnetic field configuration, where the axial magnetic field is produced using permanent magnets or electromagnets, or alternatively by axial magnetization of magnetizable inner and outer electrodes. The schematics also show the electrode surfaces, which can be modified for catalytic promotion of desired chemical reactions.

FIG. 4A is a conceptual schematic of a new method of producing an axial magnetic field in the space between the inner electrode (5) and the outer shell (6) (functioning as an outer electrode), concentric cylindrical electrodes, as well as along the surfaces of the inner and outer electrodes. The axial magnetic field along the radial electric field together provide the E×B force that acts to move charged particles between the electrodes and at the electrode surfaces in an azimuthal direction, with respect to the common, center axis of the concentric cylindrical electrodes.

Figure 4B:
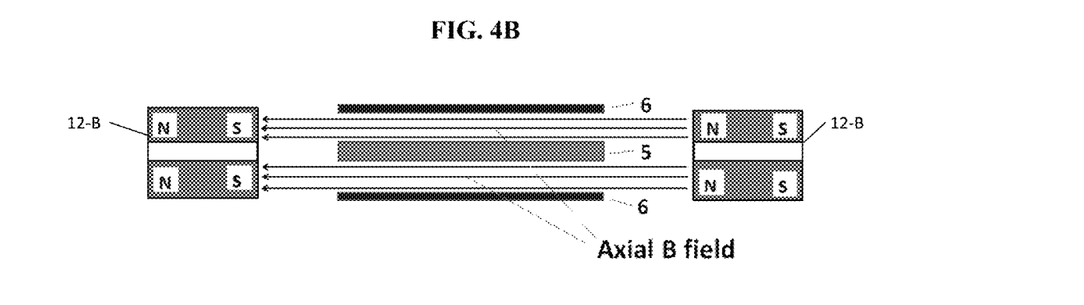

In a first embodiment as shown in FIG. 4B, the axial magnetic field ("B field") between the inner (5) and outer (6) electrodes is provided by an annular or a pair of external annular permanent magnets 12-B, which are magnetized in the axial direction. The inner (5) and outer (6) electrodes are located between the pair of annular magnets, where the use of annular magnets efficiently provides the axial magnetic field primarily between the inner and outer electrodes and along their surfaces.

Figure 4C:
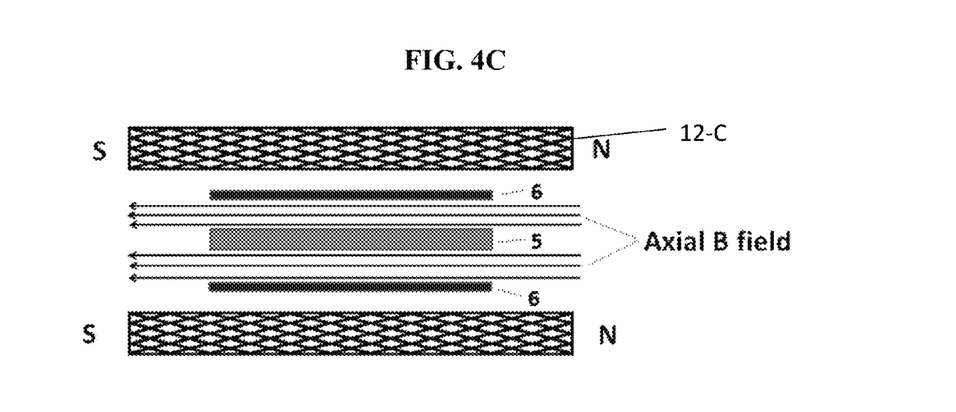

In a second embodiment as shown in FIG. 4C, an electromagnet, such as a superconducting electromagnet 12-C, provides the axial magnetic field between the inner (5) and outer (6) electrodes and along their surfaces. Adjustable axial magnetic fields, whose intensity can be adjusted, are provided by superconducting magnet 12-C.

Figure 4D:
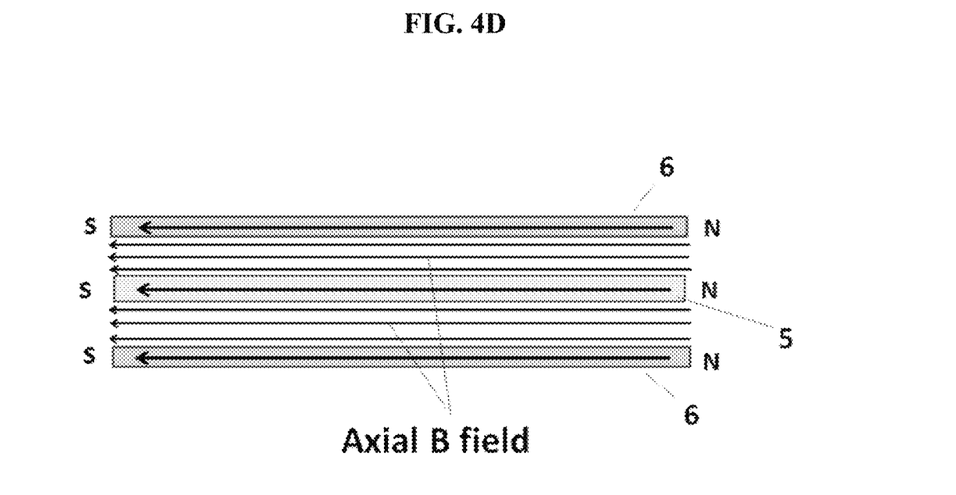
Figure 5A:
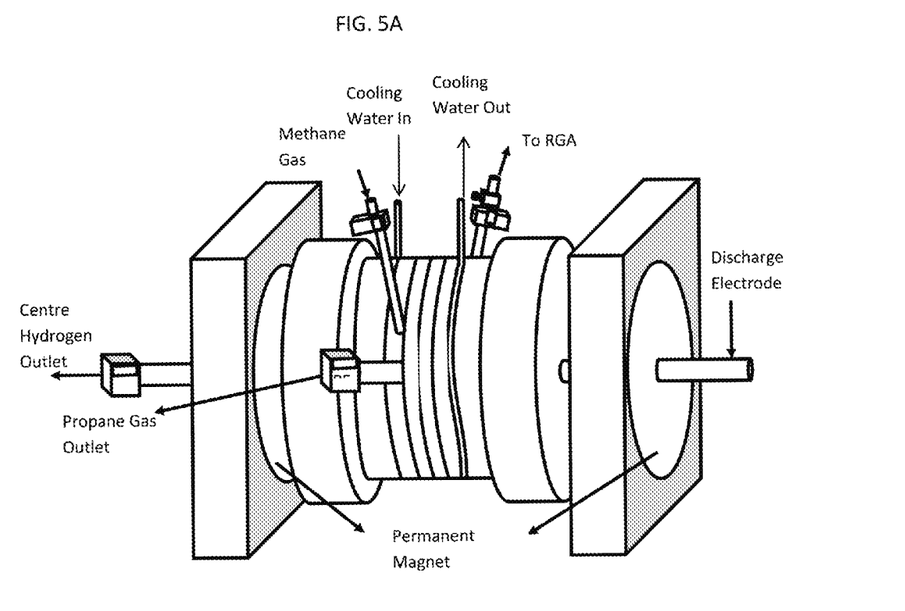
FIG. 5A is a side view of an exemplary small chamber with a permanent magnet.
Figure 5B:
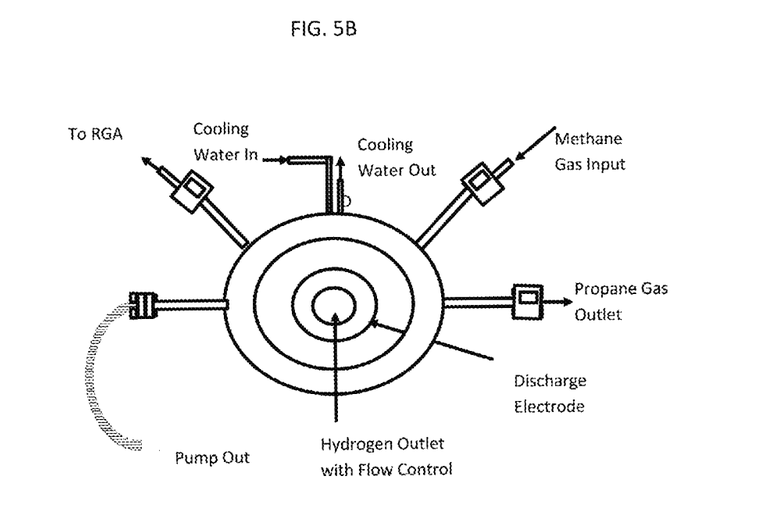
FIG. 5B is a cross-sectional view of FIG. 5A.
Figure 6A:
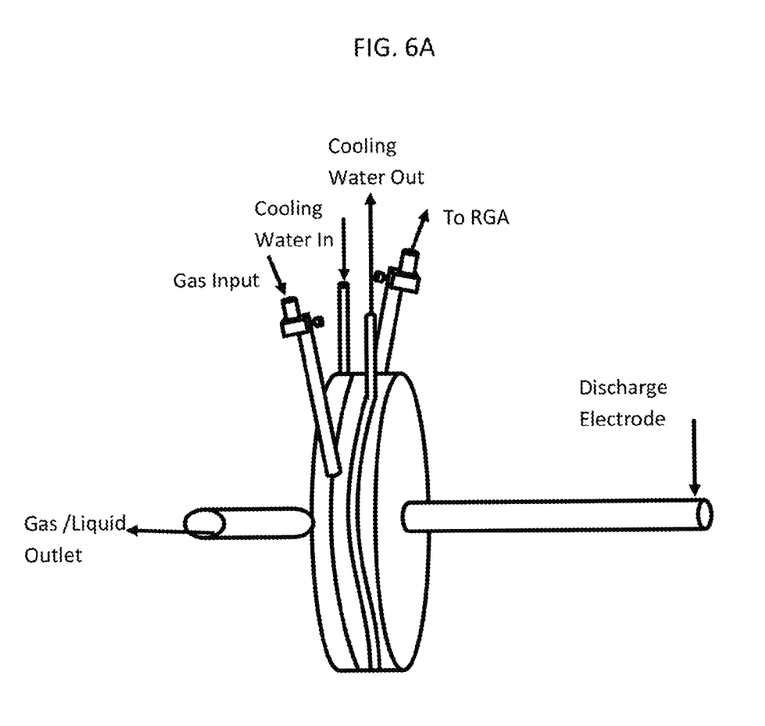
FIG. 6A is a side view of an alternate small chamber embodiment.
Figure 6B:
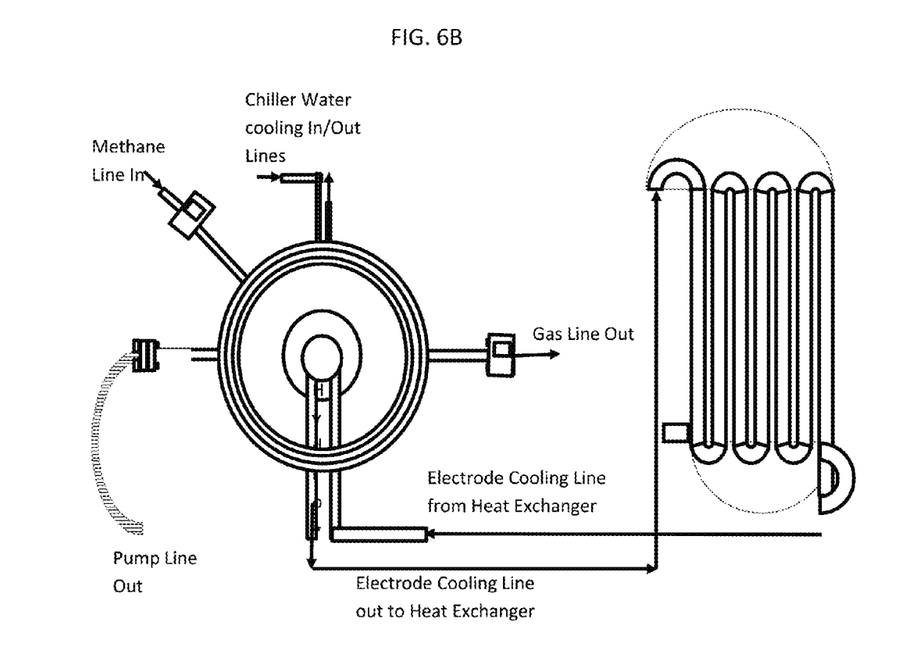
FIG. 6B is a cross-sectional view of FIG. 6A including a heat exchanger.
Figure 7:
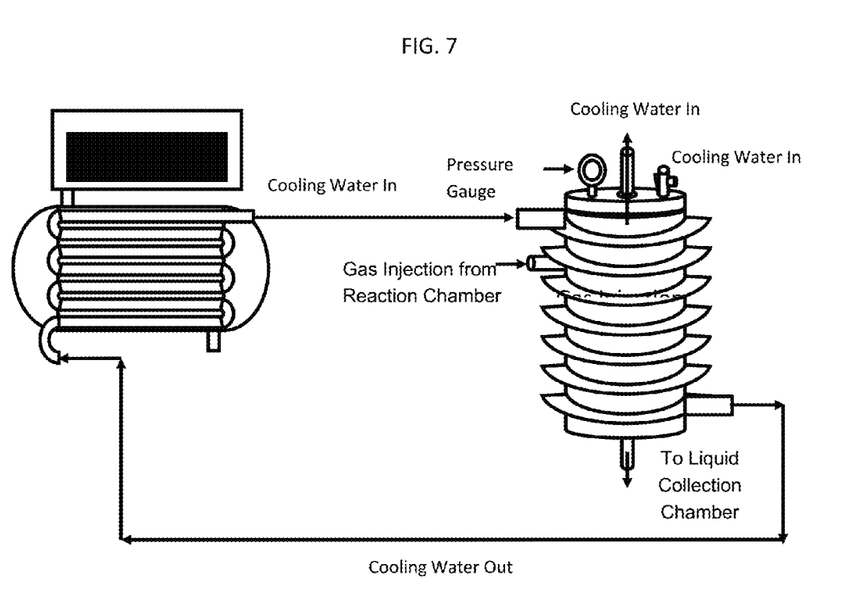
FIG. 7 is a schematic diagram of a gas collection system embodiment.
Figure 8:
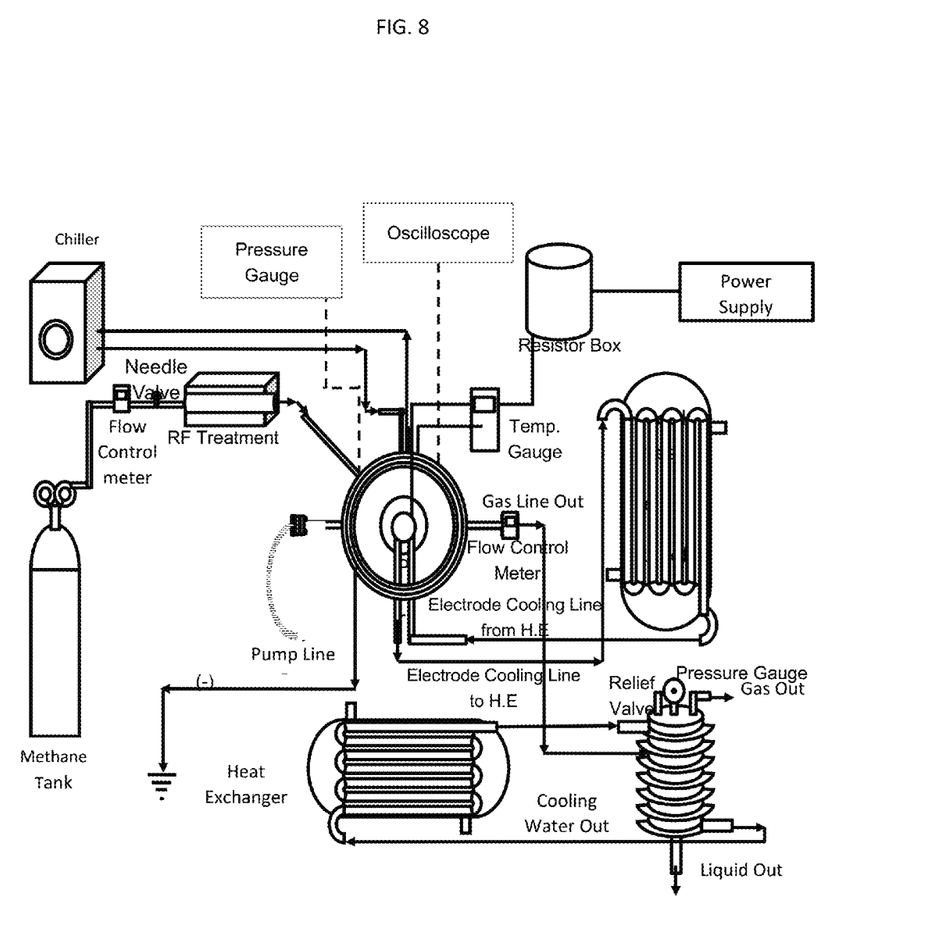
FIG. 8 is a schematic diagram of a complete setup in accordance with an embodiment of the invention.

A third embodiment, shown in FIG. 4D, allows the economic and efficient scalability of providing an axial magnetic field between the inner (5) and outer (6) concentric electrodes and along their surfaces. In this third embodiment the inner (5) and outer (6) electrodes are comprised of a magnetizable material, which is magnetized in the same axial direction. The permanently, axially magnetized inner (5) and outer (6) electrodes also provide axial magnetic field lines in the gap between the inner and outer electrodes. The magnetizable material of the inner and outer electrodes can be magnetized in the same axial direction by a non-superconducting or superconducting electromagnet. By magnetizing the inner and outer cylindrical electrodes, the axial magnetic field B may be introduced without either the additional use of a superconducting magnet or use of an external pair of annular permanent magnets. This improvement greatly decreases cost and increases the scalability and portability of the apparatus.

In addition to being used as the magnetic source, both the inner electrode (5) and outer electrode (6) may have a catalytic coating on the interior surface to assist in desired chemical reactions.

The magnetic array or superconducting magnet is used to generate a magnetic field in the axial direction z perpendicular to the radial direction, while the electric field is generated by the power supply in the radial direction. The current generated from the power supply in the radial plane perpendicular to the magnetic field in the axial plane induces a rotational force about the z-axis. This force is called the Lorentz force, represented by the following formula: $F=J\times B$, where F is the rotational force (Lorentz force), J is the current density perpendicular to the B field and B is the magnitude of the magnetic field. The rotational force is dependent on the transfer of charges from the central electrode (5) to the wall of the outer shroud (6).

Using the system illustrated in FIGS. 1 and 2, extremely high rotation velocities can be achieved that directly contribute to an extremely high separation efficiency, as shown in the following equation:

$$q(r) + 1 = \exp\left(\frac{\omega^2 r^2 \Delta m}{2kT}\right)$$

wherein q is the separation factor, $\omega$ is the rotation rate, r is the radius, $\Delta m$ is the species mass difference, k is the Boltzmann constant and T is the temperature. The equation shows that the separation efficiency depends exponentially on the square of the rotation velocity.

Rotation and current are the two main factors that contribute to the emergence of hydrocarbon radicals and hydrogen in atomic forms. Centrifugal forces, local heating by electrical current, micro-turbulence as well as molecular collisions contribute to the formation of desired chemical and atomic species being rotated.

A compact module can be designed using permanent magnets and transported to needed locations for the processing natural gas. These modules form an array for series or parallel operation. In the case of series operation, each outlet is sent forward for further purification. A successive or tandem operation is equivalent to the purification inside one single unit of a larger diameter. The parallel operation allows for a larger throughput.

FIGS. 5A-5B, 6A-6B, 7 and 8 show various system implementations in accordance with the present disclosure. In all embodiments as shown, cooling water comes into the chamber through an inlet and flows between the double walls of the chamber to cool down the shroud. Two cooling lines connect a heat exchanger with the inner electrode. Hot water flows out to the heat exchanger through an outlet, where heat is removed from the water. The cooled water is then run back to the inner electrode in a continuous operating cycle, which enables sustained chemical reactions to take place in the chamber.

A residual gas analyzer (RGA) provides accurate composition data of both methane and propane in accordance with the amount present in each of the given states post-discharge from the chamber. The amounts of methane and propane along with the percentage that each of them represents in the total amount of natural gas converted are obtained from a Utilities Library Menu of the RGA software. RGAs are well known mass spectrometers in the art and as such further detailed description is not provided herein. Given the variable pressures and temperatures of the different forms of gas within the chamber, those skilled in the art will recognize that various known methods to determine them accurately can be used in accordance with the invention.

In accordance with a further aspect of the invention, a gas collection system contains cooling water tubes and pressure gauges. Since different liquefied natural gas products can be produced under different temperature and pressure conditions, the pressure gauges and cooling water tubes adjust the pressure and temperature in the reaction chamber to attain the conditions needed for each product.

Figure 9:
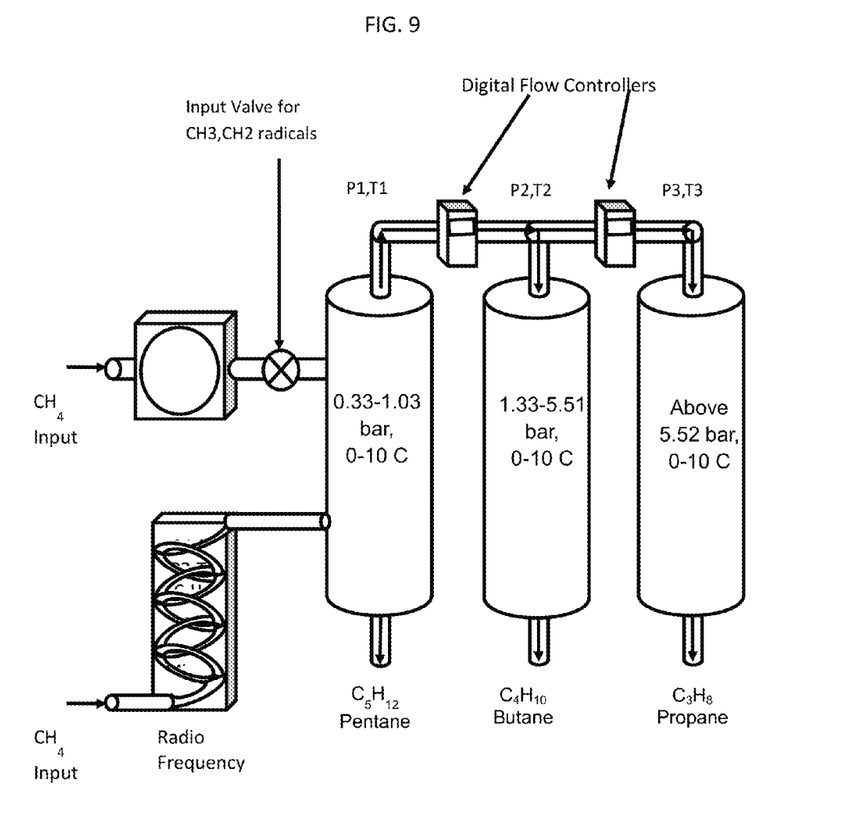
FIGS. 9 and 10 show exemplary embodiments of array collectors for collecting various liquefied natural gas products in accordance with the invention.
Figure 10:
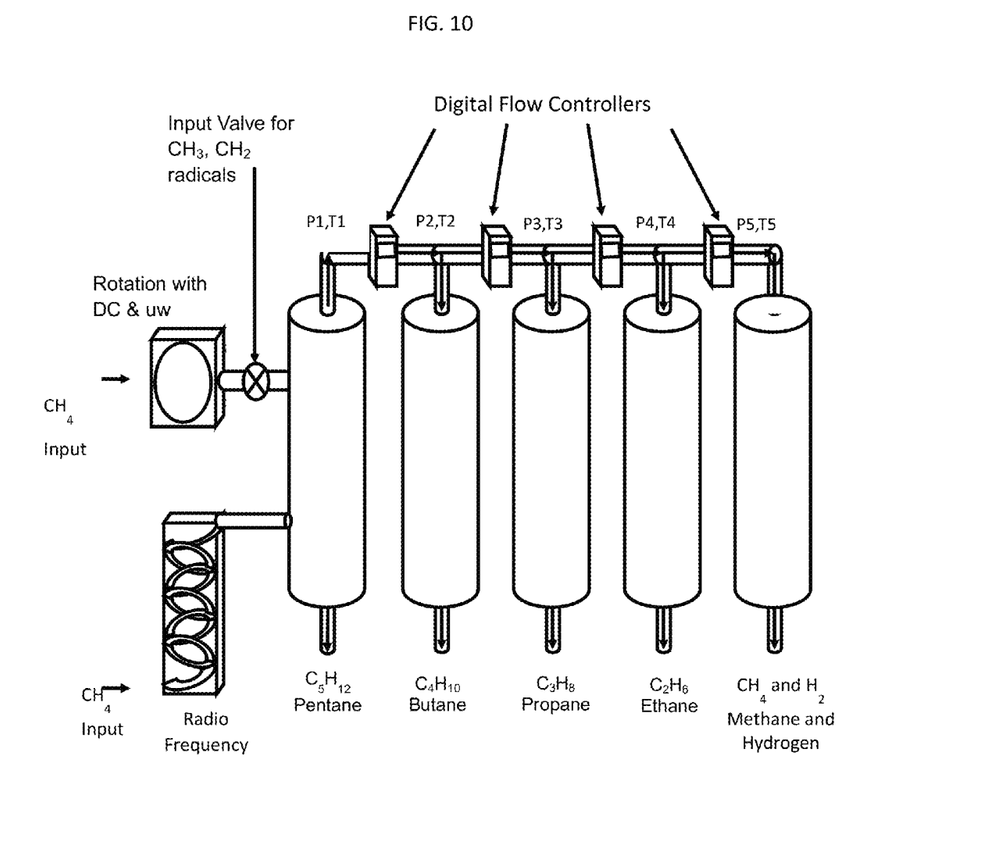

FIGS. 9 and 10 illustrate exemplary array collectors that collect different liquefied products in accordance with well-known phase diagrams showing the conditions under which various different gas products such as methane, butane, propane, ethane, etc. will become liquefied. By using different collectors in a coupled array, each of which is coupled to a digital flow controller including temperature and pressure gauges that actuate valves for the collector tanks, different conditions can be created to collect different liquefied products such as methane, butane, propane, ethane, and hydrogen gas. As pressure increases from P1 to P5 as shown, the pressure becomes increasingly higher to meet the liquefaction conditions for each gas.

While the example embodiments discussed fuels such as pentane, methane, propane and butane, all higher order liquids such as gasoline, jet fuels, and diesel fuels are contemplated by the present disclosure and will be recognized as being included in the scope of the following claims.

What is claimed is:

1. A method for chemical conversion of natural gas to liquefied form, comprising:
   providing a feedstock natural gas mixture into a chamber;
   generating an electric field in a first direction of said chamber;
   injecting electrical energy into said chamber to at least partially ionize the gas mixture and to cause dissociation of natural gas in said mixture into hydrocarbon radicals;
   generating a magnetic field in a second direction of said chamber perpendicular to the first direction to induce rotation of said ionized gas mixture about an axis of said chamber and to induce chemical reactions between said hydrocarbon radicals to form hydrocarbon molecules having increased hydrocarbon chain length from said radicals, and to cause said hydrocarbon molecules of increased chain length to move to a location in said chamber having a larger radius than a location of said radicals in said chamber;
   controlling at least temperature conditions at the perimeter of said chamber to produce a liquefied natural gas product in said chamber; and
   recovering at least one liquefied natural gas product from said rotating ionized natural gas mixture.

2. A method as set forth in claim 1, wherein the step of injecting comprises using infrared energy.

3. A method as set forth in claim 1, wherein the step of injecting comprises using laser energy.

4. A method as set forth in claim 1, wherein said feedstock natural gas mixture comprises a mixture of natural gas with a readily ionizable background gas.

5. A method as set forth in claim 4, wherein said readily ionizable background gas comprises argon.

6. A method as set forth in claim 1, wherein the step of generating a magnetic field comprises using a superconducting magnet.

7. A method as set forth in claim 1, wherein the step of generating a magnetic field comprises using a permanent magnet.

8. A method as set forth in claim 1, wherein the step of generating a magnetic field comprises magnetizing components of said chamber.

9. A method as set forth in claim 1, further comprising controlling pressure conditions to produce a liquefied natural gas product in said chamber.

10. A method as set forth in claim 1, further comprising recovering hydrogen gas from said chamber.

11. A method as set forth in claim 1, wherein the step of recovering comprises using an array of collectors that each collects a different liquefied product in accordance with phase transition conditions for different liquefied products.

12. A method for chemical conversion of natural gas to liquefied form, comprising:
   providing a feedstock natural gas mixture into a chamber;
   generating an electric field in a first direction of said chamber;
   injecting electrical energy into said chamber to at least partially ionize the gas mixture and to cause dissociation of natural gas in said mixture into hydrocarbon radicals;
   generating a magnetic field in a second direction of said chamber perpendicular to the first direction to induce rotation of said ionized gas mixture about an axis of said chamber and to induce chemical reactions between said hydrocarbon radicals to form hydrocarbon molecules having increased hydrocarbon chain length from said radicals, and to cause said hydrocarbon molecules of increased chain length to move to a location in said chamber having a larger radius than a location of said radicals in said chamber;
   controlling at least temperature conditions at the perimeter of said chamber to produce a liquefied natural gas product in said chamber; and
   recovering at least one liquefied natural gas product from said rotating ionized natural gas mixture;
   wherein the step of injecting comprises using RF energy.

13. A method for chemical conversion of natural gas to liquefied form, comprising:
   providing a feedstock natural gas mixture into a chamber;
   generating an electric field in a first direction of said chamber;
   injecting electrical energy into said chamber to at least partially ionize the gas mixture and to cause dissociation of natural gas in said mixture into hydrocarbon radicals;
   generating a magnetic field in a second direction of said chamber perpendicular to the first direction to induce rotation of said ionized gas mixture about an axis of said chamber and to induce chemical reactions between said hydrocarbon radicals to form hydrocarbon molecules having increased hydrocarbon chain length from said radicals, and to cause said hydrocarbon molecules of increased chain length to move to a location in said chamber having a larger radius than a location of said radicals in said chamber;
   controlling at least temperature conditions at the perimeter of said chamber to produce a liquefied natural gas product in said chamber; and
   recovering at least one liquefied natural gas product from said rotating ionized natural gas mixture;
   wherein the step of injecting comprises using microwave energy.

* * * * *